United States Patent
Amrhein et al.

(10) Patent No.: US 9,852,161 B2
(45) Date of Patent: Dec. 26, 2017

(54) AUTONOMIC DATA PARTITION PLACEMENT IN AN IN-MEMORY DATA GRID

(71) Applicant: International Business Machines Corporation, Armonk, NY (US)

(72) Inventors: Dustin K. Amrhein, Zachary, LA (US); Douglas C. Berg, Rochester, MN (US); Nitin Gaur, Round Rock, TX (US); Christopher D. Johnson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 757 days.

(21) Appl. No.: 14/252,018

(22) Filed: Apr. 14, 2014

(65) Prior Publication Data

US 2015/0293945 A1    Oct. 15, 2015

(51) Int. Cl.
    *G06F 17/30*    (2006.01)

(52) U.S. Cl.
    CPC .. *G06F 17/30292* (2013.01); *G06F 17/30584* (2013.01)

(58) Field of Classification Search
    CPC ......... G06F 17/30292; G06F 17/30289; G06F 9/5077
    USPC ................................................. 707/802, 803
    See application file for complete search history.

(56) References Cited

U.S. PATENT DOCUMENTS

| | | | | |
|---|---|---|---|---|
| 2012/0197959 A1* | 8/2012 | Oliver | ................... | G06F 9/5038 709/201 |
| 2012/0278344 A1* | 11/2012 | Berg | ................... | G06F 17/3048 707/754 |
| 2012/0303675 A1* | 11/2012 | Antani | ................ | G06F 17/3033 707/802 |
| 2012/0311295 A1* | 12/2012 | Gaur | ..................... | G06F 9/5072 711/173 |

OTHER PUBLICATIONS

Dice, "Fact Sheet: iRODS integrated Rule Oriented Data System," Data Intensive Cyber Environments Center, University of North Carolina at Chapel Hill, University of California, San Diego.

* cited by examiner

*Primary Examiner* — Robert Beausoliel, Jr.
*Assistant Examiner* — Alexandria Bromell
(74) *Attorney, Agent, or Firm* — Teddi E. Maranzano

(57) ABSTRACT

A method for autonomic data partition placement in an in-memory data grid (IMDG) based on usage sampling is provided. The method may include sampling access pattern data, during a configurable window, of a client accessing one or more data objects in the IMDG. Analytics are applied to the sampled access pattern data to determine a replacement partition schema, based on the analyzed sampled access pattern data exceeding at least one performance threshold. The deployed partition schema is altered, based on the replacement partition schema.

12 Claims, 5 Drawing Sheets

AUTONOMIC DATA PARTITION PLACEMENT IN AN IN-MEMORY DATA GRID

FIELD OF INVENTION

The present disclosure relates generally to the field of data management, and more specifically to autonomic data partition placement in an in-memory data grid.

BACKGROUND

An in-memory data grid (IMDG) consists of multiple interconnected virtual machines, referred to as Java® Virtual Machines (JVMs) (Java and all Java-based trademarks and logos are trademarks or registered trademarks of Oracle and/or its affiliates), which provide an address space for locating data for ease of access by applications. In one example, a database or other data source may be loaded into memory to an IMDG. By hosting the data in-memory, application performance is enhanced, since demand for physical server resources, particularly Input/Output (I/O) overhead to physical disk devices is reduced. In another example, an IMDG may be used to provide transient storage for data that is created, for example, within a web application session. Depending on the application's requirements, different IMDG partitioning schemas may be chosen. However, reconfiguring the IMDG to maintain performance levels or to respond to changing data access patterns is a disruptive manual process that may require extensive system unavailability. If an autonomic IMDG partitioning mechanism can be implemented based on data usage, then system availability and high performance levels may be maintained.

BRIEF SUMMARY

Among other things, autonomic (i.e., automatic) data partition placement in an in-memory data grid (IMDG) based on usage sampling is provided. According to an embodiment of the invention, a method of autonomic data partition placement in an in-memory data grid (IMDG) based on usage sampling is provided. The method may include sampling access pattern data, during a configurable window, of a client accessing one or more data objects in the IMDG; applying analytics to the sampled access pattern data to determine a replacement partition schema, based on the analyzed sampled access pattern data exceeding at least one performance threshold; and altering a deployed partition schema, based on the replacement partition schema.

In another embodiment, a computer program product for autonomic data partition placement in an in-memory data grid (IMDG) based on usage sampling is provided. The computer program product may include a computer readable storage medium readable by a processing circuit and storing instructions for execution by the processing circuit for performing a method. The method comprises sampling access pattern data, during a configurable window, of a client accessing one or more data objects in the IMDG; applying analytics to the sampled access pattern data to determine a replacement partition schema, based on the analyzed sampled access pattern data exceeding at least one performance threshold; and altering a deployed partition schema, based on the replacement partition schema.

In another embodiment, a computer system for autonomic data partition placement in an in-memory data grid (IMDG) based on usage sampling, comprising one or more processors, one or more computer-readable storage devices, and a plurality of program instructions stored on at least one of the one or more storage devices for execution by at least one of the one or more processors, the plurality of program instructions comprising: a computer readable storage medium readable by a processing circuit and storing instructions for execution by the processing circuit for performing a method comprising: sampling access pattern data, during a configurable window, of a client accessing one or more data objects in the IMDG; applying analytics to the sampled access pattern data to determine a replacement partition schema, based on the analyzed sampled access pattern data exceeding at least one performance threshold; and altering a deployed partition schema, based on the replacement partition schema.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Embodiments of the present invention will now be described with reference to the figures. FIGS. 1-4, depict an exemplary implementation for autonomic data partition placement in an in memory data grid.

Figure 1:
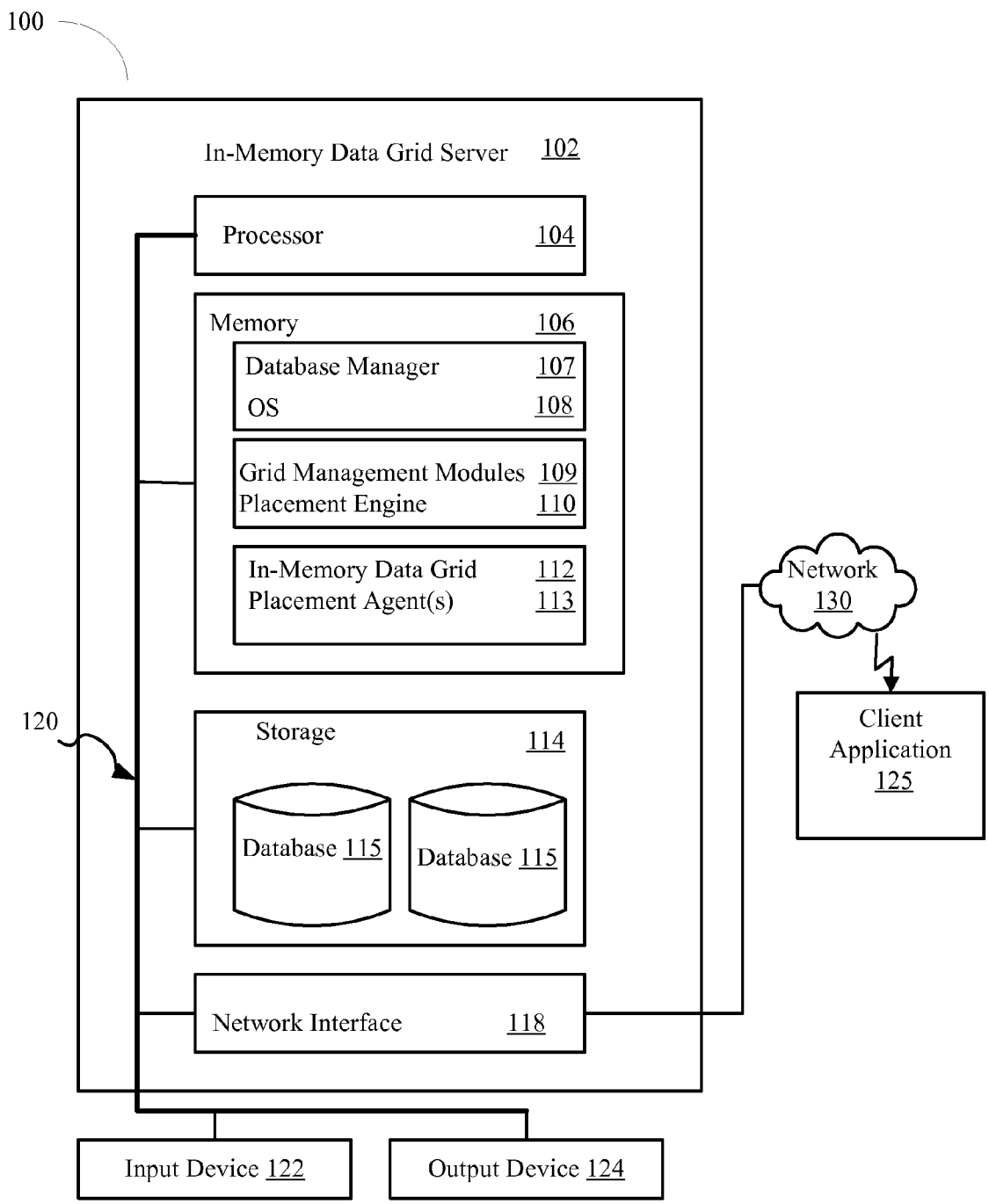
FIG. 1 is a block diagram of a system for autonomic data partition placement in an in memory data grid according to an exemplary embodiment of the disclosure.

Referring to FIG. 1, a system 100 according to an exemplary embodiment is depicted. The networked system 100 includes an in-memory data grid server 102 (IMDG) containing an in-memory data grid 112. The IMDG server 102 may also be connected to other computers and servers via a network 130. The network 130 may include connections, such as wire, wireless communication links, or fiber optic cables.

The IMDG server 102 generally includes a processor 104 connected via a bus 120 to a memory 106, a network interface device 118, a storage 114, an input device 122, and an output device 124. The IMDG server 102 is generally under the control of an operating system 108, such as for example Linux. However, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger formats. The network interface device 118 may be any type of network communications device allowing the IMDG server 102 to communicate with other computers via the network 130.

The storage 114 may be a combination of fixed persistent optical and/or solid state storage devices. The memory 106 and the storage 114 may be part of one virtual address space spanning multiple primary and secondary storage devices.

The input device 122 may be any device for providing input to the database server 102. For example, a keyboard and/or a mouse may be used. The output device 124 may be any device for providing output to a user of the IMDG server 102. Although shown separately from the input device 122, the output device 124 and input device 122 may be combined, as in a display screen with an integrated touch-screen.

As shown, the memory 106 of the IMDG server 102 includes one or more Grid Management Modules 109 configured to manage components of the IMDG 112. One or more Placement Agents 113, may be configured to sample performance metrics in the IMDG 112 and to relay the performance metrics to the Placement Engine 110. One or more databases 115, contained in the storage 114 of the IMDG server 102 may provide persistent storage by offloading data from the IMDG 112 to the one or more databases 115 under the management of a Database Manager 107, working in cooperation with the Grid Management Module(s) 109.

The client application 125 may be configured on a separate workstation or other computer that is remote from the IMDG server 102. In this context, remote refers to a client using a network connection, such as the network 130, to communicate with the IMDG server 102. As will be discussed with reference to FIG. 4, the IMDG server 102 and the computer hosting the client application 125 may include internal components 800 and external components 900.

The particular description in FIG. 1 is for illustrative purposes only; it should be understood that the invention is not limited to specific described embodiments, and any combination is contemplated to implement and practice the invention.

Figure 2:
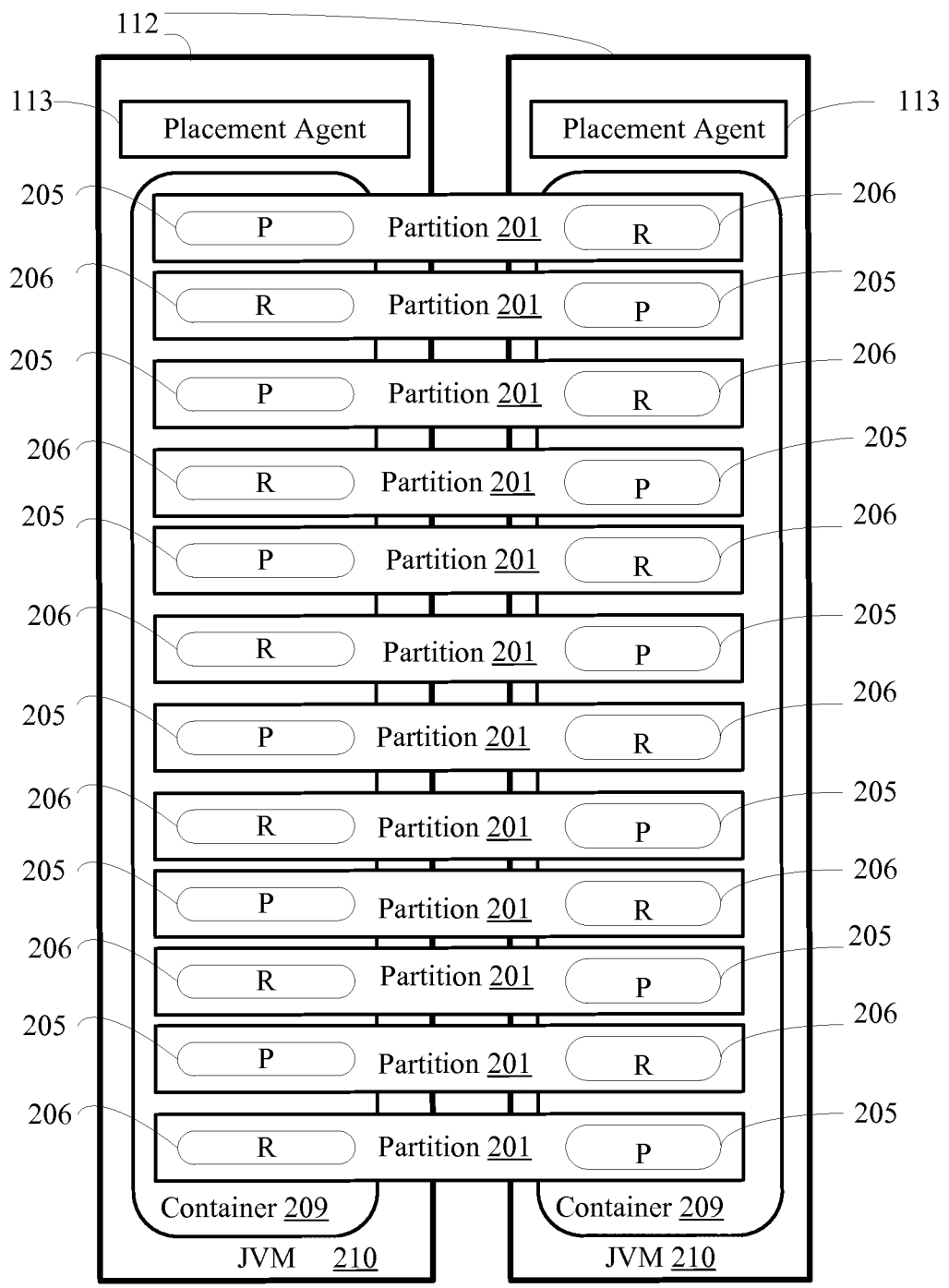
FIG. 2 is a block diagram illustrating an exemplary in-memory data grid.

FIG. 2 is a detailed illustration of the exemplary in-memory data grid (IMDG) configuration IMDG 112 of FIG. 1. The IMDG 112 is shown with two Java® Virtual Machines (JVM) 210. Each JVM 210 may host more than one container 209. Each container 209 may be configured with multiple data partitions 201, each holding a subset of the data. Additionally, the data in a partition 201 may be stored in one or more shards: such as a primary shard P 205 and one or more replica shards R 206. To provide high availability, a primary shard P 205 and its replica R 206 may be placed on different JVMs 210. This may minimize the impact of a JVM 210 removal, either for scheduled maintenance or as a result of a failure. As shown, the IMDG 112 may be referred to as a fixed partition configuration. Using the fixed partition configuration, the number of partitions 201 in the configuration remains constant, even when redistributed across a varying number of containers 209. For example, if two additional JVMs 210, each hosting an additional container 209, are added to this configuration, the architecture, under the management of the grid management modules 109, may redistribute the existing partitions 201 across the four JVMs 210. As a result, three partitions 201 are re-assigned to each container 209 within each JVM 210, thereby maintaining the total of twelve partitions 201. However, the redistribution described in this example is re-active, rather than pro-active, since it is triggered as a result of a failure.

Figure 2A:
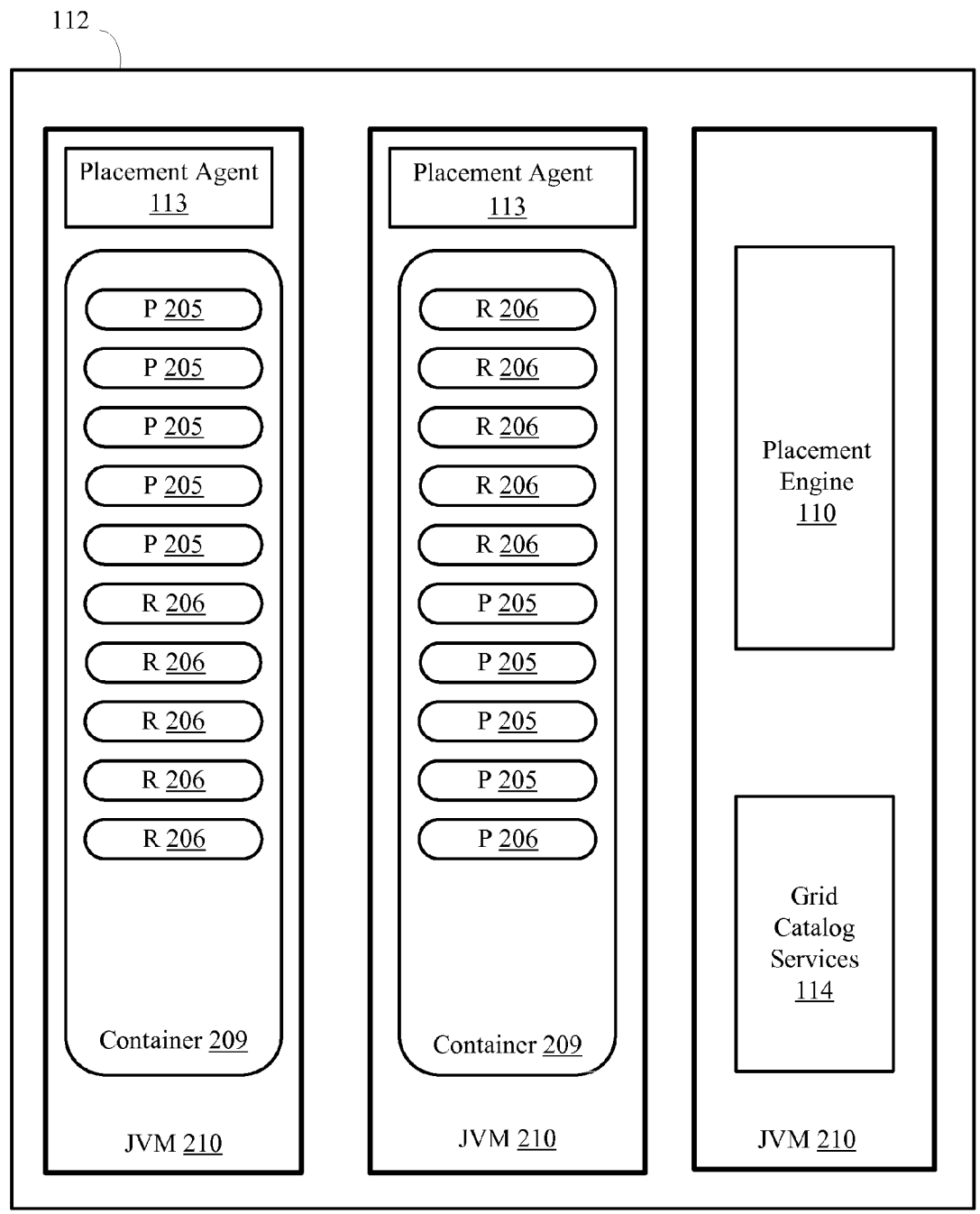
FIG. 2A is a block diagram illustrating another exemplary in-memory data grid.

FIG. 2A illustrates another type of in-memory data grid configuration: the per-container. In contrast to the fixed partition configuration, the number of partitions 201 in the per-container configuration may increase as additional containers 209 are added. For example, the configuration in FIG. 2A shows two JVMs 210, each hosting a container 209. Each container 209 holds five primary partitions, with a primary shard P 205 in each primary partition. There are also five replica partitions, with a replica shard R 206 in each replica partition. If two additional JVMs 210, each hosting an additional container 209, are added to the per-container configuration, five primary partitions, each with primary shards P 205, and five replica partitions, each with replica shards R 206, are also added to each container 209 of the two additional JVMs 210. The resulting configuration now contains forty partitions 201, effectively doubling the number from the original configuration. In this exemplary per-container configuration, to recover a failed JVM 210, the replica shards R 206 are promoted to primary shards P 205, new replica shards R 206 may be created, and the total number of shards may be evenly distributed among the remaining JVMs 210.

A placement agent(s) 113, which runs in the IMDG 112 as one or more modules within the memory a JVM 210, collects access pattern data from the JVMs 210 and makes it available to the placement engine 110. In one configuration, one or more placement agent(s) 113 may be located in one or more JVMs 210 that also store data objects. Alternatively, the one or more placement agent(s) 113 may be located in one or more JVMs 210 that are dedicated to hosting only placement agent(s) 113. A placement agent(s) 113 may be kept highly available when it is configured to relocate to another JVM 210 within the IMDG 112 in case of failure, for example, of the hosting JVM 210. Additionally, the placement agent(s) 113 and the JVMs 210 may be kept highly available by configuring them to relocate between IMDG servers 102 in case one of the IMDG servers 102 fails. Maintaining high availability between servers is known in the art, and may include, for example, installing specialized software on the servers, and redundant paths to networks and storage devices.

The number and location of the placement agent(s) 113 may be determined using well-known capacity planning and performance management techniques, such as monitoring network speed and latency for a rate of data transmission between placement agent(s) 113 and the placement engine 110 (FIG. 1). In an embodiment, a deployed placement agent(s) 113 may send an alert to a system administrator if a performance metric, such as a rate of data transmission, exceeds a configured threshold. Such monitoring may promote balanced access to computing resources and the placement engine 110 (FIG. 1), while ensuring that the placement agent(s) 113 does not excessively consume computing resources at the expense of the applications connecting to the IMDG 112. By providing flexibility in configuring placement agent(s) 113 operations, a system administrator may balance how system resources, such as CPU and memory, are allocated, so that applications accessing the IMDG 112 are not disadvantaged by housekeeping overhead. Exemplary housekeeping overhead may include, for example, dispatching a placement agent(s) 113, buffering the sampled access pattern data, packaging and sending the sampled access pattern data to the placement engine 110 (FIG. 1), and releasing system resources at the end of the configured window.

The placement engine 110 acts as an analytical component, retrieving and analyzing sampled access pattern data from the placement agent(s) 113. Based on the results, the placement engine 110 determines whether the existing partitioning configuration is performing efficiently. The placement engine 110 may be located in a JVM 210 within the IMDG 112, and may similarly be made highly available. When the placement engine 110 is configured as a service that is collocated with the grid catalog services 114, as shown, the high availability manager of the catalog service may also be configured to manage the availability of the placement engine 110.

Figure 3:
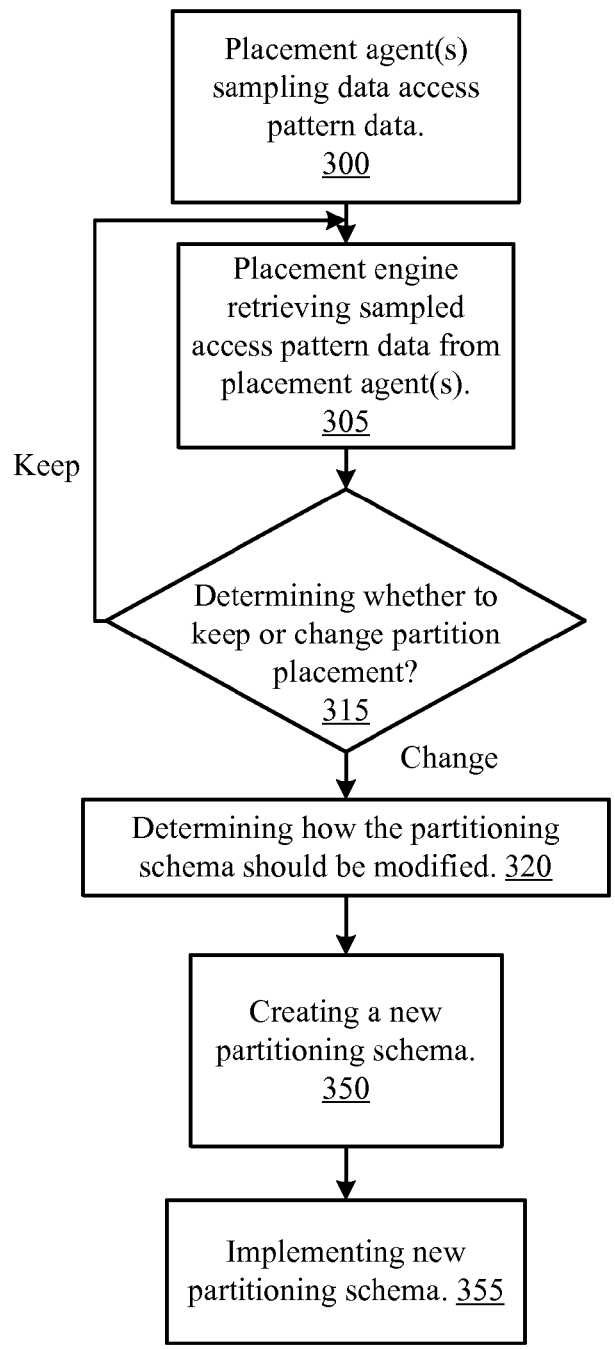
FIG. 3 is a flowchart of an exemplary embodiment of the disclosure.

FIG. 3 describes an exemplary embodiment for autonomic data partition placement in an in-memory data grid. When a IMDG 112 is deployed, one or more placement agents 113 begin sampling how the clients are accessing the IMDG 112 to determine data access patterns over time, 300, and to form a data access history. One skilled in the art of performance management may well appreciate that various performance metrics are routinely sampled and stored by a computer's operating system. To sample access pattern data, the placement agent(s) 113 may contain its own performance metric gathering logic, or may retrieve relevant performance metrics that have been gathered and stored by the computer's operating system. Exemplary access pattern data may include: a number and frequency of read operations and/or write operations that a client performs; how much data the client transfers during a read or write operation; whether the client predominantly accesses a particular data object; and whether a client's data accesses are balanced between reading and writing or are predominantly one access type or the other.

The placement agent(s) 113 may sample access pattern data during a window that may be configured at IMDG 112 deployment, and dynamically modified during IMDG 112 operation. A configurable window may specify, for example, a defined time interval, such as thirty minutes, a duration of a transaction, a duration of a Structured Query Language (SQL) query, or as long as a defined application is active.

The placement engine 110 may retrieve the sampled access pattern data from the placement agent(s) 113, 305 by any number of well-known methods. These include placing the data in a buffer for the placement engine 110 to retrieve, continuously streaming the data to the placement engine 110, and placing the data in a dedicated filesystem or database configured for that purpose.

The placement engine 110 may determine whether to keep or change the deployed partition placements and IMDG 112 schema, based on analyzing the sampled access pattern data that it retrieves from the placement agent(s) 113, 315. One skilled in the art may well appreciate that determining a capacity plan and schema for an IMDG requires several complex calculations. These calculations are automated by the placement engine 110 as it analyzes the sampled access pattern data from the placement agent(s) 113. For example, the total required memory for the data objects may be calculated using the number and average size of the data objects that are contained in the IMDG 112 and the number of replicas. Other calculations determine how many partitions should be created for optimal performance, based on the calculated memory requirement and estimated number of data objects. Correctly estimating the number of partitions ensures a balanced distribution of data objects across the JVMs 210, since after deployment modifying the configuration of a IMDG to add resources, such as CPU and memory, is disruptive to client applications. In an embodiment, the placement engine 110 may be configured with dynamically modifiable threshold values, such as a maximum percentage of CPU or memory usage, a response time threshold for a SQL query, or a threshold at which data object storage should be increased. If at least one of the threshold values is reached, the placement engine 110 may determine to change the partition placement, 315. However, an efficiently performing IMDG, i.e., one that operates within defined threshold values, is not changed, and the placement engine 110 continues to retrieve access pattern data from the placement agent(s) 113.

When the analyzed sampled access pattern data indicate that the partitioning schema should be modified, the placement engine 110, through further analysis, determines how the partitioning schema should be modified to return the analyzed performance metrics to acceptable levels, 320. In an embodiment, the placement engine 110 may be configured with rules ranking various performance metrics in order of importance, for example, read response time may be weighted more heavily than write performance in a IMDG grid where data queries predominate.

The placement engine 110 may calculate, for example, that a data object (e.g., a shard P 205 in a partition 201) is approaching its limit of allocated storage space within the JVM 210. In that case, the placement engine 110 may determine that the data object should be re-partitioned to include additional space, and calculate a new partitioning schema. In another case, the placement engine 110 may identify that a data object creates a performance bottleneck in a particular JVM 210 because it is accessed at a statistically determined higher rate than other data objects. In that case, the placement engine 110 may determine that the partition placement for this data object should be changed to alleviate the performance bottleneck. For example, the placement engine 110 may determine that moving the data object to another JVM 210 would alleviate the performance bottleneck and return performance to acceptable metrics. In another example, the placement engine 110 may determine that the data object should be redistributed as several smaller data objects to alleviate the performance bottleneck. In making this decision, the placement engine 110 may weigh write performance more heavily during statistical analytics, for example, because write activity consumes more system resources, particularly CPU. Based on the analysis of the collected sampled access pattern data, these data objects may be redistributed across multiple JVMs 210.

Exemplary modifications may include simply adding partitions or JVMs 210, and redistributing data within the existing partitioning schema. However, a major re-architecting of the IMDG 112 may be initiated, such as, from per-container to fixed partition, if the placement engine 110 recognizes a major change in data access patterns. Such a major change in data access patterns might occur, for example, if the placement engine 110 recognizes that the pattern of an application's data accesses have changed from web-based conversational, i.e., per-container, to database-driven fixed partition. Whether modifying the partitioning schema involves redistributing shards 205 and partitions 201, or a major re-architecting, the placement engine 110 creates a new partitioning schema, 350, reflecting the required modifications.

The IMDG data is moved, as needed, to implement the new partitioning schema, 355. In a typical high-availability configuration, both primary 205 and replica 206 shards are present in the IMDG 112. The replica 206 shards may be deleted to free their resources for use in transitioning to the new partitioning schema. The original primary 205 shards may be replicated as new replica shards 206 using the new partitioning schema. At this point, the client application may continue to access the original primary shards 205 which are still active in the original partitioning schema. Once the data is securely moved to the new replica shards 206 in the new partitioning schema, the application may be transparently re-directed to the new partitioning schema, which now may be activated. The original partitioning schema may be de-activated and the original primary shards 205 may be deleted. To maintain a highly-available configuration, the new replica shards 206 may be promoted to primary shards 205 and replicated to create new replica shards 206. To maximize the application's availability to the end-user clients, the various data migrations and re-configurations may be executed as background processes.

Figure 4:
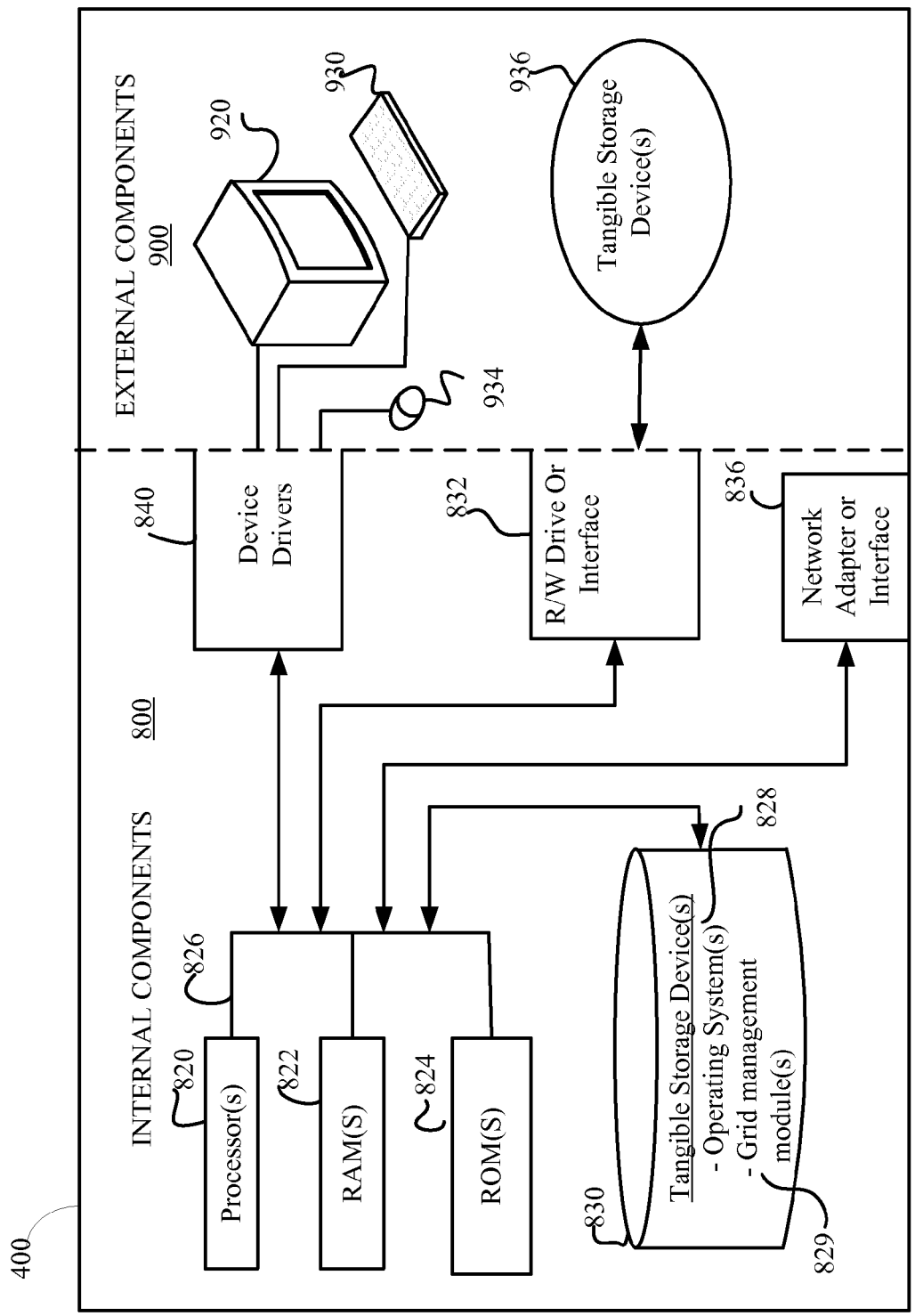
FIG. 4 is a schematic block diagram of hardware and software of the computer environment according to an embodiment of the method of FIG. 3.

Referring now to FIG. 4, computing device 400 may include respective sets of internal components 800 and external components 900 that together may provide an environment for a software application, such as a MIME content parser. Each of the sets of internal components 800 includes one or more processors 820; one or more computer-readable RAMs 822; one or more computer-readable ROMs 824 on one or more buses 826; one or more operating systems 828; one or more software applications (e.g., grid management modules 829) executing the method of FIG. 3; and one or more computer-readable tangible storage devices 830. The one or more operating systems 828 and MIME parsing modules 829 are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The grid management modules 829, and operating system 828 that are associated with computing device 400, can be downloaded to computing device 400 from an external computer (e.g., server) via a network (for example, the Internet, a local area network, or other wide area network) and respective network adapters or interfaces 836. From the network adapters (or switch port adapters) or interfaces 836 and operating system 828 associated with computing device 400 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A method for autonomic data partition placement in an in-memory data grid (IMDG) based on usage sampling comprising:

sampling access pattern data, during a configurable window, of a client accessing one or more data objects in the IMDG, wherein access pattern data comprises: 1) a number of read operations performed, 2) a number of write operations performed, 3) a frequency by which the one or more data objects in the IMDG is accessed, 4) an amount of data transferred during a read operation, and 5) an amount of data transferred during a write operation;

applying analytics to the sampled access pattern data to determine a replacement partition schema, based on the analyzed sampled access pattern data exceeding at least one performance threshold; and altering a deployed partition schema, based on the replacement partition schema, wherein the altering is transparent to the client accessing the one or more data objects in the IMDG.

2. The method of claim 1, wherein:

one or more placement agents sample the access pattern data; and one or more placement engines apply the analytics to the sampled access pattern data.

3. The method of claim 1, wherein the configurable window comprises:

a defined time interval;

a duration of a transaction;

a duration of a Structured Query Language (SQL) query; and a duration of an execution of an application.

4. The method of claim 1, wherein altering the deployed partition schema comprises:

creating the replacement partition schema as a per-container partition schema, based on the deployed partition schema being a fixed-partition schema;

creating the replacement partition schema as a fixed-partition partition schema, based on the deployed partition schema being the per-container partition schema;

replicating data from the deployed partition schema to the replacement partition schema;

de-activating the deployed partition schema; and
promoting the replacement partition schema to the deployed partition schema.

5. A computer program product for autonomic data partition placement in an in-memory data grid (IMDG) based on usage sampling comprising:
a computer readable storage medium readable by a processing circuit and storing instructions for execution by the processing circuit for performing a method comprising:
sampling access pattern data, during a configurable window, of a client accessing one or more data objects in the IMDG, wherein access pattern data comprises: 1) a number of read operations performed, 2) a number of write operations performed, 3) a frequency by which the one or more data objects in the IMDG is accessed, 4) an amount of data transferred during a read operation, and 5) an amount of data transferred during a write operation;
applying analytics to the sampled access pattern data to determine a replacement partition schema, based on the analyzed sampled access pattern data exceeding at least one performance threshold, wherein the at least one performance threshold comprises: 1) a maximum percentage of CPU usage, 2) a maximum percentage of memory usage, 3) exceeding a limit of allocated storage by at least one of the data objects in the IMDG, 4) a response time, and 5) exceeding a number of accesses to at least one of the data objects in the IMDG, based on the data object in the IMDG being accessed at a statistically higher rate than other data objects in the IMDG; and
altering a deployed partition schema, based on the replacement partition schema, wherein the altering is transparent to the client accessing the one or more data objects in the IMDG.

6. The computer program product of claim 5, wherein:
one or more placement agents sample the access pattern data; and
one or more placement engines apply the analytics to the sampled access pattern data.

7. The computer program product of claim 5, wherein the configurable window comprises:
a defined time interval;
a duration of a transaction;
a duration of a Structured Query Language (SQL) query; and
a duration of an execution of an application.

8. The computer program product of claim 5, wherein the altering the deployed partition schema comprises:
creating the replacement partition schema as a per-container partition schema, based on the deployed partition schema being a fixed-partition schema;
creating the replacement partition schema as a fixed-partition partition schema, based on the deployed partition schema being the per-container partition schema;
replicating data from the deployed partition schema to the replacement partition schema;
de-activating the deployed partition schema; and
promoting the replacement partition schema to the deployed partition schema.

9. A computer system for autonomic data partition placement in an in-memory data grid (IMDG) based on usage sampling, comprising one or more processors, one or more computer-readable storage devices, and a plurality of program instructions stored on at least one of the one or more storage devices for execution by at least one of the one or more processors, the plurality of program instructions comprising:
a computer readable storage medium readable by a processing circuit and storing instructions for execution by the processing circuit for performing a method comprising:
sampling access pattern data, during a configurable window, of a client accessing one or more data objects in the IMDG, wherein access pattern data comprises: 1) a number of read operations performed, 2) a number of write operations performed, 3) a frequency by which the one or more data objects in the IMDG is accessed, 4) an amount of data transferred during a read operation, and 5) an amount of data transferred during a write operation;
applying analytics to the sampled access pattern data to determine a replacement partition schema, based on the analyzed sampled access pattern data exceeding at least one performance threshold, wherein the at least one performance threshold comprises: 1) a maximum percentage of CPU usage, 2) a maximum percentage of memory usage, 3) exceeding a limit of allocated storage by at least one of the data objects in the IMDG, 4) a response time, and 5) exceeding a number of accesses to at least one of the data objects in the IMDG, based on the data object in the IMDG being accessed at a statistically higher rate than other data objects in the IMDG; and
altering a deployed partition schema, based on the replacement partition schema, wherein the altering is transparent to the client accessing the one or more data objects in the IMDG.

10. The computer system of claim 9, wherein:
one or more placement agents sample the access patterns; and
one or more placement engines apply the analytics to the sampled access pattern data.

11. The computer system of claim 9, wherein the configurable window comprises:
a defined time interval;
a duration of a transaction;
a duration of a Structured Query Language (SQL) query; and
a duration of an execution of an application.

12. The computer system of claim 9, wherein altering the deployed partition schema comprises:
creating the replacement partition schema as a per-container partition schema, based on the deployed partition schema being a fixed-partition schema;
creating the replacement partition schema as a fixed-partition partition schema, based on the deployed partition schema being the per-container partition schema;
replicating data from the deployed partition schema to the replacement partition schema;
de-activating the deployed partition schema; and
promoting the replacement partition schema to the deployed partition schema.

\* \* \* \* \*